United States Patent Office 3,540,214
Patented Nov. 17, 1970

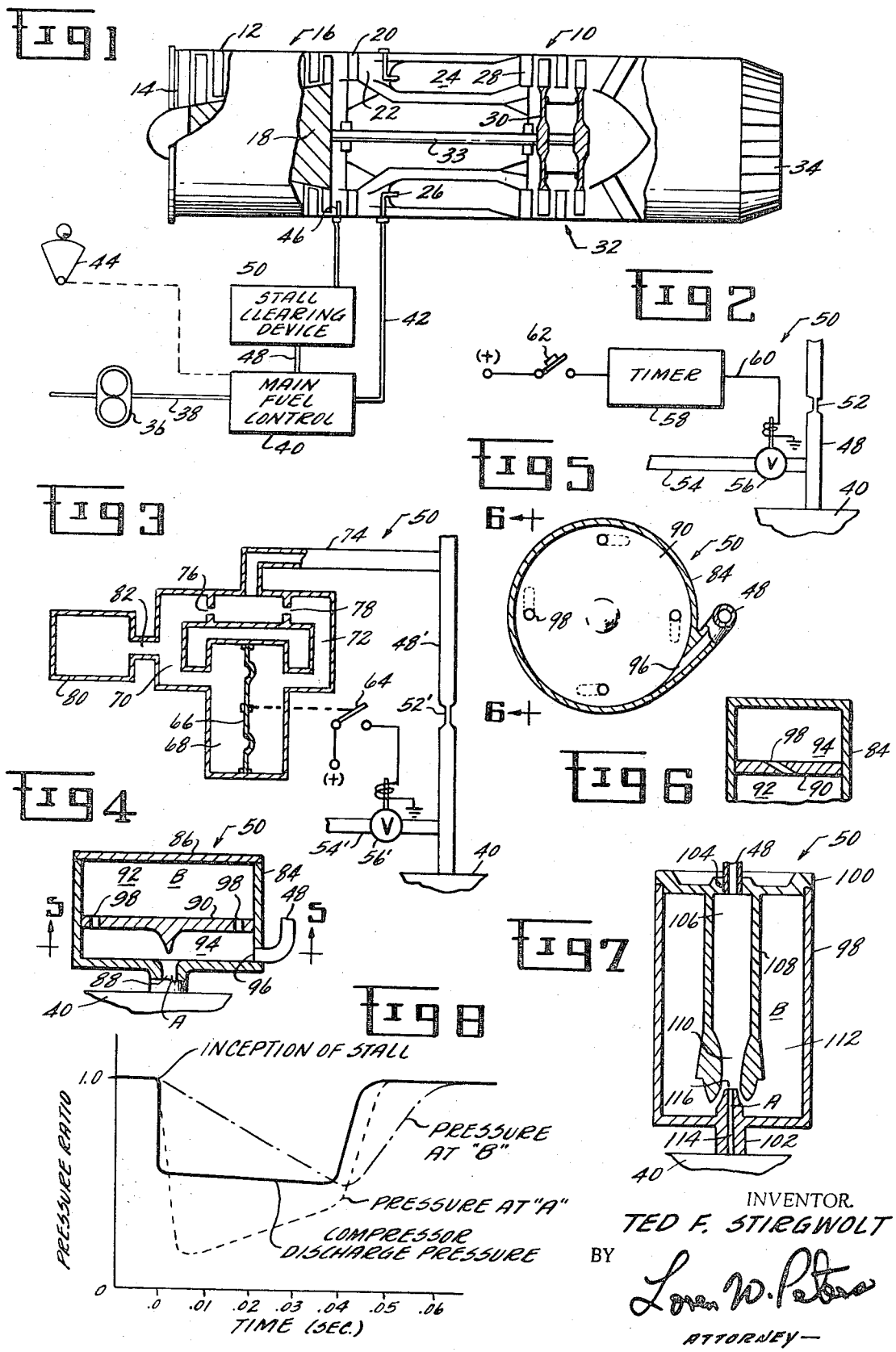

3,540,214
FUEL SYSTEMS FOR GAS TURBINE ENGINES
Ted F. Stirgwolt, Cincinnati, Ohio, assignor to General Electric Company, a corporation of New York
Continuation-in-part of application Ser. No. 627,918, Apr. 3, 1967. This application Jan. 15, 1969, Ser. No. 791,297
Int. Cl. F02c 9/08, 3/02
U.S. Cl. 60—39.28       5 Claims

ABSTRACT OF THE DISCLOSURE

The disclosure shows a number of devices 50 for eliminating compressor stall in a gas turbine engine 10. The devices 50 modify a control input to a fuel scheduling unit 40 for the engine 10 so that fuel flow is rapidly reduced to a low level for a very short period of time. When the compressor 16 of the engine 10 is in a stalled condition, the relatively short reduction in fuel flow clears the stall without substantially affecting the thrust output of the engine.

---

This application is a continuation-in-part of my co-pending application, Ser. No. 627,918, filed Apr. 3, 1967, now abandoned.

BACKGROUND OF THE INVENTION

The present invention relates to fuel systems for gas turbine engines and more specifically to fuel systems for eliminating compressor stall.

Modern gas turbine engines generally comprise a compressor for pressurizing air, a combustor wherein the pressurized air is mixed with fuel and ignited, and a turbine which extracts some of the energy of the ignited gases to drive the compressor before the gases are discharged from the engine to produce a propulsive thrust. There are a number of types of compressors for gas turbine engines, but the most common type is an axial flow type compressor. In this compressor, air is compressed by a plurality of blades on a rotating drum which impart velocity pressure to the air.

One the of the problems associated particularly with axial flow compressor is an operating condition commonly referred to as compressor stall. For a given operating condition, stall occurs when the rotating compressor blades have an angle of attack relative to the air passing through the compressor that is large enough for the blades to stall out in the manner of an aircraft wing. When the blades "stall out" the air suddenly separates and the blades suddenly cease to impart velocity pressure to the air. This stall condition causes a sharp reduction in the pressure output of the compressor which significantly affects engine performance. If the stalled condition is prolonged, injury to engine components may result.

Compressor stall in an aircraft gas turbine engine is most commonly precipitated by ingestion of hot gases into the engine due to firing of a rocket or gun from an aircraft or reingestion of exhaust gases from the actuation of a thrust reverser. The hot gases increase the temperature of the fluid passing through the compressor sufficiently rapid to cause stall.

Compressor stall may be eliminated by a reduction in the level of combustion in the combustor to decrease the back pressure on the compressor and permit an increase in fluid flow therethrough. This is done by reducing the amount of fuel mixed with the air in the combustor. In a pilot-operated engine, the fuel is reduced by slowly retarding an engine power lever to a low power position. While effectively eliminating compressor stall, the above method has the disadvantage that the thrust output of the engine is substantially reduced for a relatively long period of time. In the case of a military aircraft, this loss of thrust has serious consequences because at the very time the stalled condition exists, i.e., gun or rocket firing during an attack approach, the aircraft requires sustained full power to minimize the time in the attack area.

OBJECT OF THE INVENTION

Accordingly, it is an object of the present invention to economically and effectively eliminate compressor stall in a gas turbine engine without affecting the thrust output thereof.

SUMMARY OF THE INVENTION

The above ends are attained by providing a fuel system for a gas turbine engine having an axial flow compressor for pressurizing air and a combustor wherein fuel is mixed with air from the combustor and ignited to provide continuous combustion. The combustion gases are discharged from the engine to produce a propulsive thrust.

The fuel system comprises means for scheduling fuel to the combustor. Means are provided for rapidly temporarily reducing the flow of fuel scheduled to said combustor to lower the level of combustion in the combustor and reduce the back pressure on the compressor so that a stalled condition of the compressor may be eliminated and the level of propulsive thrust from the engine is substantially unaffected.

The above and other related objects and features of the present invention will be apparent from a reading of the following description of the disclosure found in the accompanying drawing and the novelty thereof pointed out in the appended claims.

DESCRIPTION OF THE DRAWINGS

FIG. 1 is a highly simplified view of a gas turbine engine having a fuel system which incorporates a stall clearing device embodying the present invention.

FIGS. 2 and 3 show alternate embodiments of the stall clearing device shown in FIG. 1.

FIG. 4 is still another embodiment of the stall clearing device of FIG. 1.

FIG. 5 is a view taken on line 5—5 of FIG. 4.

FIG. 6 is a fragmented section view taken along line 6—6 of FIG. 5.

FIG. 7 is another embodiment of the stall clearing device of FIG. 1.

FIG. 8 is a graph showing pressure time relationships for the stall clearing devices of FIGS. 4 and 6.

DESCRIPTION OF THE PREFERRED EMBODIMENTS

Referring to FIG. 1, there is shown a gas turbine engine 10 which has a casing 12, open at one end, to provide an inlet 14 for an axial flow compressor 16. The compressor 16 comprises a bladed rotatable drum 18, which imparts a velocity pressure to the air passing thereacross. A series of downstream vanes 20 and a diffuser passageway 22 enable the static pressure of the air to be increased for discharge to a combustor 24. Fuel is injected into the combustor 24 through a series of fuel nozzles 26 and the resultant mixture ignited to increase the energy level of the gases. The hot gases of combustion are discharged through a turbine inlet nozzle 28 and across a bladed drum 30 of a turbine 32 which drives the compressor through an interconnecting shaft 33. The hot gases from the turbine 32 are discharged through a nozzle 34 to produce a propulsive thrust for the engine 10.

The fuel nozzles 26 are supplied by a fuel system comprising an engine driven fuel pump 36 which pressurizes fuel for delivery through a conduit 38 to a main fuel control unit 40. The main fuel control unit 40 schedules flow of fuel through a nozzle supply conduit 42 to the nozzles 26 as a function of a number of control inputs to control the level of combusion in the combustor 24 and hence the thrust output of the engine 10. As herein illustrated in simplified form, a first control input to the main fuel control 40 is provided by an operator controlled power lever 44 (note the mechanical connection). A second control input is provided by a compressor discharge pressure sensor 46 which transmits to the main fuel control 40 a fluid pressure signal through a conduit 48. A stall clearing device 50, to be discussed later, is interposed in conduit 48. Other control imputs, including sensed engine parameters other than compressor discharge pressure, may be utilized to provide greater flexibility in controlling fuel flow, but are not necessary to an understanding of the present invention.

In operation, the fuel to the engine is scheduled as a function of operator demand by the power lever input and as a function of air flow through the engine as provided by the compressor discharge pressure sensor 46. Thus, for a given power lever setting, the fuel flow to the combustor 24 varies in the same direction as the compressor discharge pressure varies.

When stall occurs in the compressor 16, its discharge pressure rapidly drops, as previously stated, which proportionately lowers the fuel flow to the combustor 24. The proportionate reduction in fuel flow is not enough, however, to reduce the back pressure on the compressor sufficiently to eliminate the stall. To eliminate the stall, the compressor discharge fluid pressure signal applied to the main fuel control 40 is reduced to a level below actual compressor discharge pressure by the stall clearing device to substantially reduce the fuel flow to the combustor 24. In order that the thrust output of the engine 10 remain unaffected when the stall occurs, the fuel flow is reduced for a very short period of time. It has been found that a reduction in fuel flow for a relatively short period of time will efficiently eliminate the compressor stall without noticeably affecting the thrust output of the engine. This is so, because the engine cannot change its thrust output fast enough to follow the reduction in fuel flow.

Referring particularly to FIG. 2, there is shown one embodiment of the stall clearing device 50. The stall clearing device comprises an orifice 52 positioned in the conduit 48 adjacent the main fuel control 40. A discharge conduit 54 extends from the conduit 48 between the orifice 52 and the main fuel control 40 to a suitable low pressure source, such as the atmosphere. A normally closed solenoid operated valve 56 is disposed in the discharge conduit 54. The solenoid operated valve 56 is operated by electrical signals from a timer 58 through an electrical connection 60 whenever a switch 62 is closed to energize the timer 58.

When the switch 62 is closed, the timer 58 sends out pulsed signals to intermittently open the valve 56 for a relatively short period of time. When this is done, the pressure in the conduit 48 between the orifice 52 and the main fuel control 40 is rapidly lowered to the relatively low pressure of the atmosphere because the orifice 52 prevents an increase in pressure from the compressor discharge sensor for the short time the valve 56 is open. This reduction in the pressure signal to the fuel control causes a rapid reduction in the fuel flow to the combustor 24. The orifice 52 is positioned as close to the main fuel control 40 as possible to minimize the volume open to atmosphere and insure a rapid reduction in the pressure signal applied to the main fuel control 40.

The operation of the timer 58 may be initiated simultaneously with the operation of a component on an aircraft which would produce conditions that induce a compressor stall, such as a gun or rocket firing mechanism. During a sustained gun firing, the hot gases which induce the stall would exist for a relatively long period of time. Since the timer 58 produces intermittent signals to open the valve 56, the stalled condition of the compressor is constantly eliminated. The time that the valve 56 is opened, relative to its closed position, is adjusted to effectively clear the stall while minimizing the effect on the thrust output of the engine.

Reference is now had to FIG. 3 which illustrates another embodiment of the stall clearing device 50 which automatically lowers the signal to the main fuel control to a value below compressor discharge pressure when stall occurs. In this embodiment, a conduit 48' with an orifice 52' is disposed adjacent the main fuel control 40. A normally closed solenoid operated valve 56' is disposed in a discharge conduit 54' that is open to the atmosphere. The valve 56' is actuated by closing of a switch 64 in response to displacement of a diaphragm 66 disposed in a chamber 68. Conduits 70, 72 extend from opposite ends of the chamber 68 to a conduit 74 which extends to the conduit 48 upstream of the orifice 52'. A pair of orifices 76, 78 are disposed in the conduits 70 and 72 adjacent the conduit 74. An accumulation chamber 80 is connected to the conduit 70 by an interconnecting conduit 82.

During operation of the engine 10, as previously stated, a rapid reduction in the discharge pressure from the compressor 16 occurs during a stall condition. This reduction in pressure causes an outflow of fluid from the conduits 70 and 72 past the orifices 76, 78. The relatively small volume in conduit 72 causes the pressure therein to rapidly decrease. However, since the accumulation chamber 80 is connected to the conduit 70, the pressurized air therein will be discharged into the conduit 70 causing the pressure therein to be decreased at a slower rate than conduit 70. This difference in pressure in the conduits 70 and 72 causes a momentary differential pressure to displace the diaphragm 66 and actuate the switch 64, and the valve 56' is then opened to lower the pressure signal applied to the main fuel control 40. As the pressure in conduits 70 and 72 equalizes, the diaphragm is returned to its neutral position and the valve 56' closed to restore normal functioning of the compressor discharge input to the main fuel control 40. The size of the accumulation chamber 80 and the areas of the orifices 76 and 78 are selected to cause displacement of the diaphragm 66 only during stall of the compressor 16 when rapid compressor discharge pressure changes occur and not during transient operation when moderate changes exist.

Reference is now had to FIG. 4, 5 and 6 which show still another embodiment of the stall clearing device 50 to be used with the fuel system for the engine 10. The device 50 comprises a cylinder 84 with a cap 86 at one end and a passageway 88 at the other end which connects with the main fuel control 40. A circular plate 90 is positioned in the cylinder 84 to form an accumulation chamber 92 and a vortex chamber 94. A tangential passageway 96 extends from the vortex chamber 94 to the conduit 48 which connects with the compressor discharge sensor 46. A series of openings 98 in the plate 90 connect the accumulation chamber 92 to the vortex chamber 94 and are slanted toward a direction tangent to the wall of vortex chamber 94 (see FIG. 6).

In operation, normal compressor discharge pressure signals are transmitted to the main fuel control through the conduit 48, the vortex chamber 94 and the passageway 88. During a stall condition, the compressor discharge pressure rapidly decreases and the pressure in conduit 48 rapidly decreases, thus causing an outflow of air from the accumulation chamber 92 and the vortex chamber 94. Disposition of the outlet passageway 96 tangentially to the cylindrical vortex chamber cooperates with the circumferential location and angled orientation of openings 98 to create a free vortex flow (the angled orientation of openings 98 provides a tangential velocity component along cylinder 84 as air is discharged from accumulation chamber 92). One of the characteristics of the free vortex flow is that a pressure gradient is set up between the outer radius of the flow and the axis.

This pressure gradient causes a substantial decrease in pressure at the axis of the vortex flow or, in other words, the port 88 relative to the pressure the outer radius of the flow or conduit 48. This reduction in pressure causes a depressed compressor discharge pressure signal which reduces the fuel flow to the combustor sufficiently to eliminate the compressor stall. As the outflow of air from the chamber 92 is finished, the pressure in the conduit 88 increases and approaches the pressure in line 48 to bring the pressure signal applied to the main fuel control up to the actual discharge pressure of the compressor 60.

The size of the chamber 92 and the radius of the vortex chamber 94 are selected so that the pressure reduction of the center of the vortex chamber is sufficiently great and short in time to clear the compressor stall without substantially affecting the power output.

Reference is now had to FIG. 7 which shows another embodiment of the stall clearing device 50. In this device, a cylinder 98 has a cap 100 at one end and a fitting 102 at the other end for connection to the main fuel control 40. A fitting 104 in the cap 100 provides a connection for the conduit 48 to an inlet passageway 106 formed by a tubular element 108. A venturi passageway 110 is formed at the end of the tubular element 108. The venturi passageway at one end connects to an accumulation chamber 112 formed by the cylinder 98 in the tubular element 108. A passageway 114 in axial alignment with the venturi passageway 110 extends from the throat 116 of the venturi passageway 110 to the main fuel control 40.

In normal operation, the pressure signals from the conduit 48 are transmitted to the main fuel control through the passageways 106 and 114. When a rapid pressure decrease in the conduit 48 occurs due to a compressor stall, the pressurized air in the accumulation chamber 112 begins to flow to the conduit 48 through the venturi passageway 110, and the increase in fluid velocity at the throat 116 of the venturi passageway 110 causes a decrease in pressure relative to the downstream end. This decrease in pressure is sensed through the passageway 114 and applied to the main fuel control at a reduced compressor discharge pressure signal which causes the reduction in fuel flow necessary to eliminate the compressor stall. As the outflow of air from the accumulation chamber 112 is ended, the pressure at the throat 116 of the venturi increases to the pressure in conduit 48 for providing a normal pressure input. The volume of the accumulation chamber and the area of the venturi throat 116 are selected to reduce the compressor discharge pressure signal sufficient to clear the stall while maintaining engine thrust.

In order to more fully understand the operation of the devices shown in FIGS. 4 and 7, reference is now made to FIG. 8 which illustrates, generally, the pressure relationships that occur in these devices. The ratio of pressure after stall to pressure before stall is presented as a function of time measured from the inception of a stalled condition in the compressor 16. The solid line indicates the discharge pressure of the compressor and illustrates the rapid reduction in pressure when stall occurs. As stated previously, the reduction in compressor discharge pressure, while reducing fuel flow in this control system, does not reduce it sufficiently to eliminate the stall condition. When the stall condition occurs, the pressure in conduit 48 follows the compressor discharge pressure in the engine. However, the pressure at B, which is the accumulation chambers 92 and 112, does not reduce as rapidly but has an exponential decay of pressure (broken line). The outflow of air from the chamber 92 causes the free vortex flow which lowers the pressure at A or passage 88 to the level substantially below that of the compressor discharge pressure as shown by the dotted line. For the device of FIG. 7, the outflow of air from chamber 112 lowers the pressure at point A (dotted line) or passageway 114 below the compressor discharge pressure due to the flow through the venturi passageway 110. In both devices, the reduction in pressure at point A is rapid and occurs within several hundredths of a second. As the pressure from the accumulation chambers begin to decay, the depressed pressure signal applied to the main fuel control approaches the true compressor discharge pressure to re-establish the normal scheduling of fuel to the fuel nozzles. It should be noted that the devices are in a series with the compressor discharge pressure line and as a result have somewhat of an effect on the pressure signal applied to the main fuel control during transient operation where the compressor discharge pressure would normally increase or decrease. However, the effect on the fuel flow to the engine during this condition is minimal and has negligible effect on the normal thrust output of the engine during transient operation.

The devices, thus described, provide a rapid elimination of compressor stall in a gas turbine engine without substantially affecting the thrust output of the engine. This enables substantially full power operation of the engine during the adverse stall conditions. In addition, the elimination of the stall in a rapid period of time minimizes the adverse effect of the stall on the components of the engine. The devices shown enable greatly simplified utilization in a fuel system where the discharge pressure of the compressor is used as a control input. However, it is to be understood that the scope of the invention extends beyond the manipulations of a single control input to a fuel scheduling unit and encompass means for rapidly reducing the fuel flow to a combustor of an engine for a relatively short period of time during a stall condition. Accordingly, the spirit and scope of the invention are to be determined solely by the following claims.

Having thus described the invention, what is claimed as novel and desired to be secured by Letters Patent of the United States is:

1. In a gas turbine engine having an axial flow compressor for pressurizing air and a combustor wherein fuel is mixed with air from said compressor and ignited for sustaining combustion, the combustion gases being discharge from said engine to produce a propulsive thrust, a fuel system comprising:

means for scheduling fuel to said combustor as a function of compressor discharge pressure, said fuel scheduling means including a compressor discharge pressure signal conduit; and stall clearing means for rapidly temporarily reducing the flow of fuel scheduled to said combustor to lower the level of combustion in said combustor and reduce the back pressure on said compressor, said stall clearing means comprising, flow path means interposed in said compressor discharge pressure signal conduit, first passageway means connecting the flow path means said compressor discharge pressure signal conduit, second passageway means connected to the fuel scheduling means side of said compressor discharge prsesure signal conduit, an accumulation chamber connected to said said flow path means whereby said chamber is pressurized from the discharge of said compressor, said passageway means being positioned relative to said flow path means and said flow path means being configured for rapidly decreasing the fluid pressure signal in said second passageway means to a level below that in said first passageway means in response to a rapid outflow of fluid from said accumulation chamber.

2. The fuel system recited in claim 1 wherein, said flow path means comprises a cylindrical vortex chamber, said first passageway means is positioned tangent to the axis of said vortex chamber, said second passageway means is positioned in line with the axis of said vortex chamber, said accumulation chamber is connected to said vortex chamber through at least one passage which includes means for creating a tangential velocity component at the wall of said vortex chamber.

3. The fuel system recited in claim 2 wherein, said vortex chamber and said accumulation chamber are formed by a cylinder having a plate for dividing the cylinder into a pair of chambers, said chambers are connected by a plurality of openings extending through said plate to the radially outward portion of said vortex chamber, said openings being slanted in a direction tangent to the wall of said vortex chamber.

4. The fuel system recited in claim 1 wherein, said flow path means comprises a venturi, said first passageway means terminates at the exhaust end of said venturi, said accumulation chamber is connected to the inlet end of said venturi, said second passageway means terminates at the throat of said venturi, whereby when the discharge pressure of said compressor rapidly decreases, fluid is discharged from said accumulation chamber through the throat of said venturi, and lowers the pressure applied to said fuel scheduling means below the actual decrease in the discharge pressure of said compressor.

5. The fuel system recited in claim 4 wherein, said accumulation chamber is cylindrical, said venturi is positioned in said accumulation chamber and is concentric therewith, and said second passageway means is concentric with said venturi.

References Cited

UNITED STATES PATENTS

| 2,963,859 | 12/1960 | Roche et al. | 60—39.28 |
| 3,080,712 | 3/1963 | Wood | 60—39.29 |
| 3,115,006 | 12/1963 | Farkas | 60—39.28 |
| 3,212,260 | 10/1965 | Gardner | 60—39.28 |
| 3,267,669 | 8/1966 | Tissier | 60—39.28 |

A. LAWRENCE SMITH, Primary Examiner

U.S. Cl. X.R.

60—39.29